(12) United States Patent
White (10) Patent No.: US 9,004,330 B2
(45) Date of Patent: Apr. 14, 2015

(54) ELECTRONIC DEVICE HOLDER

(76) Inventor: Shawn White, Cleveland, OH (US)

(*) Notice: Subject to any disclaimer, the term of this patent is extended or adjusted under 35 U.S.C. 154(b) by 380 days.

(21) Appl. No.: 13/169,741

(22) Filed: Jun. 27, 2011

(65) Prior Publication Data

US 2011/0315733 A1 Dec. 29, 2011

Related U.S. Application Data

(60) Provisional application No. 61/359,343, filed on Jun. 28, 2010.

(51) Int. Cl.
*A45F 3/14* (2006.01)
*A45F 5/00* (2006.01)
*A45F 3/00* (2006.01)
*F16M 13/00* (2006.01)
*B60R 11/02* (2006.01)
*F16M 11/04* (2006.01)
*F16M 11/10* (2006.01)
*F16M 13/04* (2006.01)
*B60R 11/00* (2006.01)

(52) U.S. Cl.
CPC .................. *F16M 13/00* (2013.01); *A45F 5/00* (2013.01); *A45F 2005/006* (2013.01); *A45F 2200/0516* (2013.01); *B60R 11/02* (2013.01); *B60R 2011/0017* (2013.01); *F16M 11/041* (2013.01); *F16M 11/10* (2013.01); *F16M 13/04* (2013.01); *Y10S 224/93* (2013.01)

(58) Field of Classification Search
CPC .............. A45F 5/00; A45F 2200/0516; A45F 2200/0525
USPC .................. 224/257, 256, 325, 270, 930, 625; D3/327
See application file for complete search history.

(56) References Cited

U.S. PATENT DOCUMENTS

| 607,496 | A | * | 7/1898 | Watson | 248/444 |
|---|---|---|---|---|---|
| 3,273,484 | A | * | 9/1966 | Lapsley | 224/185 |
| 3,541,976 | A | * | 11/1970 | Rozas | 108/43 |
| 4,957,264 | A | * | 9/1990 | Hakanen | 248/510 |
| 5,551,615 | A | * | 9/1996 | McIntosh | 224/270 |
| 5,667,114 | A | * | 9/1997 | Bourque | 224/270 |
| 5,788,202 | A | * | 8/1998 | Richter | 248/316.4 |
| D427,765 | S | * | 7/2000 | Porter | D3/215 |
| 6,106,016 | A | * | 8/2000 | Bette | 281/45 |
| 6,220,491 | B1 | * | 4/2001 | Wu | 224/148.7 |
| 6,316,707 | B1 | * | 11/2001 | Glover, II | 84/387 A |
| 6,349,864 | B1 | * | 2/2002 | Lee | 224/270 |

(Continued)

*Primary Examiner* — Brian D Nash
*Assistant Examiner* — Derek Battisti
(74) *Attorney, Agent, or Firm* — Fay Sharpe LLP; James E. Scarbrough (57) ABSTRACT

A holder for holding an electronic device includes a frame and a harness pivotably connected to the frame. The harness has a pair of parallel elongated bars and at least one bracing member extending between the elongated bars. The frame has one or more side tabs for retaining an electronic device within the frame. A holder for holding an electronic device has a retaining member including a plurality of retaining tabs; and a harness member rotatably connected to the retaining member and rotatable between a stowed position and an inclined position. A holder for holding an electronic device has a harness having two parallel elongated bars; a frame having a base member and two parallel arms each having an opening therein; and a pivotable retaining member pivotably connected to the parallel arms. The retaining member releasably holds the electronic device. The elongated bars are slidably inserted into the openings of the arms.

8 Claims, 11 Drawing Sheets

(56) References Cited

U.S. PATENT DOCUMENTS

| | | | |
|---|---|---|---|
| 7,551,458 B2* | 6/2009 | Carnevali | 361/807 |
| 7,681,855 B1* | 3/2010 | Cashman et al. | 248/441.1 |
| 8,074,951 B2* | 12/2011 | Carnevali | 248/313 |
| 2004/0262344 A1* | 12/2004 | White | 224/269 |
| 2007/0090143 A1* | 4/2007 | Clayton et al. | 224/637 |
| 2008/0296449 A1* | 12/2008 | Carnevali | 248/205.1 |
| 2009/0230161 A1* | 9/2009 | Emsky | 224/257 |
| 2010/0038393 A1* | 2/2010 | Zhang | 224/600 |

* cited by examiner

FIG. 12

US 9,004,330 B2

ELECTRONIC DEVICE HOLDER

CLAIM OF PRIORITY

This application claims priority from U.S. Provisional Patent Application No. 61/359,343, filed on Jun. 28, 2010, which is hereby incorporated by reference.

BACKGROUND OF THE DISCLOSURE

Portable electronic devices are becoming more and more popular and are being used for many applications. iPhones™, cell phones, BlackBerrys™, portable electronic games, and iPads™ are able to store and display vast amounts of information in a compact and lightweight unit. Many of these devices are easily hand-held and do not require a separate container or holder. The iPad™, however, is relatively large compared to other similar compact electronic devices. For example, the iPad™ has dimensions of about ½ (one half) inch thick and is about 7.5 inches by 9.5 inches in length and width, with most of the top face being a touch screen display which doubles as a keypad when necessary. The iPad™ is particularly useful for providing and/or collecting information (e.g. written, visual, audio, video . . . ) for or from others while the user is standing or walking. For example, salespeople, waitresses, survey takers, on-the-ground event management personnel, etc., may use an iPad™ on site or at their work location.

However, a problem with using an iPad™ in such situations is that even though it is portable and lighter than a notebook, it is still too large and heavy to be conveniently "hand-held" by most users, or easily placed in a garment's pocket, or hung from a user's belt. Accordingly, this makes it difficult and non-ergonomic for use in such situations. To use the device while walking, it would either have to be hand carried or repeatedly taken out of and put back into a handbag, or shoulder bag, backpack, etc. Thus, there is a need for an electronic device holder that overcomes the above-mentioned difficulties and others while providing better and more advantageous overall results.

SUMMARY OF THE DISCLOSURE

The disclosure relates to electronic devices. More specifically, it relates to a holder for electronic devices. The holder is designed to preferably hang from the neck or shoulders of a user and provide a frame that supports and holds an electronic device such as an iPad™ at a convenient height (e.g., elbow height for the user) and a convenient angle (e.g., horizontal) for use and/or carrying as needed without having to be hand held or retrieved from a bag. In other words, the holder makes use of the electronic device hands-free for support of the device as well as carrying of the device. The device also provides an ergonomic benefit and minimizes the risk of dropping the device during use.

In the present disclosure the holder will be primarily described as being used with an iPad™ or similar device; however, the disclosure is not limited to use with the iPad™. The holder can be used with any devices such as what may have once been called a "PDA" (Personal Digital Assistant). Therefore the present disclosure and embodiments should be considered to be not just limited to usage with the iPad™.

A netbook or notebook computer may be too heavy or bulky for hanging from one's neck or for use in a crowd or while walking. On the other hand, book readers (e.g., Kindle™) are a similar size and weight such that the holder may be beneficial to use with such readers (e.g., for use by a roving information provider at an event). For example, an "ultra-light" computer may be now, or may soon become, light enough but could not be easily used with the holder unless it was also used as a generally planar "tablet" device that is used substantially by accessing its top face. A suitably small and light tablet style computer could also be used with the holder, even with a physical keyboard/keypad located adjacent to the screen.

In accordance with one aspect of the disclosure, a holder for holding an electronic device includes a frame; and a harness pivotably connected to the frame. The harness has a pair of parallel elongated bars and at least one bracing member extending between the elongated bars. The frame has one or more side tabs for retaining an electronic device within the frame.

In accordance with another aspect of the disclosure, a holder for holding an electronic device includes a retaining member having a plurality of retaining tabs; and a harness member rotatably connected to the retaining member and rotatable between a stowed position and an inclined position.

In accordance with another aspect of the disclosure, a holder for holding an electronic device has a harness having two parallel elongated bars; a frame having a base member and two parallel arms each having an opening therein; and a pivotable retaining member pivotably connected to the parallel arms. The retaining member releasably holds the electronic device. The elongated bars are slidably inserted into the openings of the arms.

Other aspects of the disclosure will become apparent after a reading of the following detailed description.

BRIEF DESCRIPTION OF THE DRAWINGS

The following is a brief description of the drawings, which are presented for the purposes of illustrating the exemplary embodiments discussed herein and not for purposes of limited the same.

DETAILED DESCRIPTION OF THE DISCLOSURE

The disclosure relates to electronic devices. More particularly, it relates to a portable holder for electronic devices.

Figure 1:
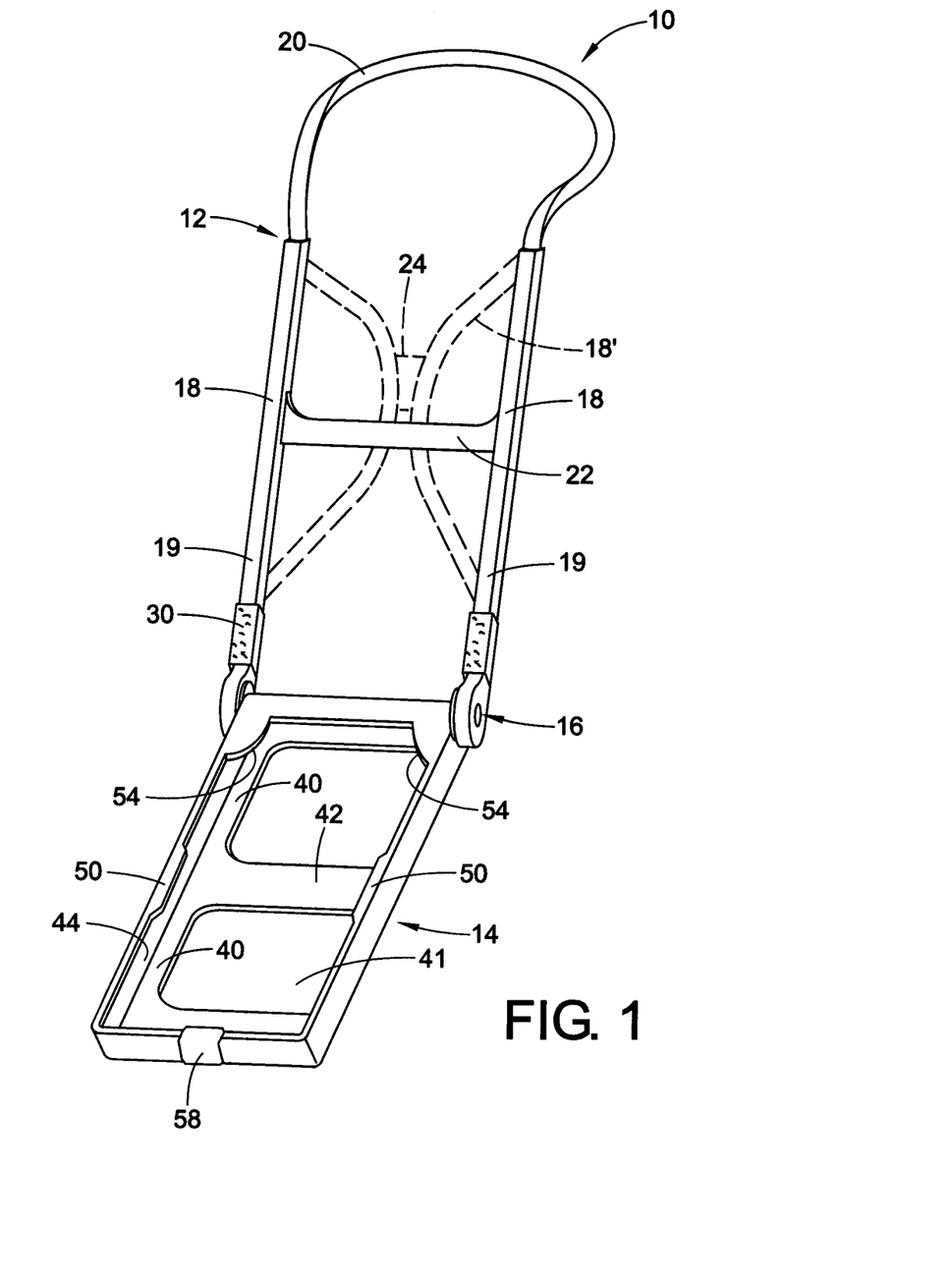
FIG. 1 is a perspective view of an electronic device holder in accordance with a preferred embodiment of the present disclosure.

Referring to FIG. 1, a first embodiment of the disclosure is shown. Electronic device holder 10 includes two main components: a holder harness 12 and a holder frame 14. Preferably these two parts are pivotingly connected by a pair of pivots 16. Frame 14 may be made of a single rigid molded piece of plastic or other material.

The holder harness 12 includes a pair of parallel elongated bars or risers 18 extending upward from the pivots 16 to a flexible neck strap 20. The neck strap 20 is a strap preferably made from, for example, a woven fabric (similar to a guitar or camera strap), a padded plastic or leather belt, or a preformed plastic member that conforms to typical neck and shoulder curves (e.g., formed as a vertical strip around the neck, but transitioned to a horizontal strap where it passes over the shoulder and downward on the chest), or any other suitable material. The harness may also act as a handle.

The risers 18 are generally more rigid, especially at their lower portion such that the riser will maintain an angle between it and the frame 14 when placed under a load (i.e. with a device positioned or secured in the frame). One or more lateral braces 22 may be added as necessary to provide additional structural strength to the holder. The frame and the risers may be made of various materials, such as metal or rubberized plastic.

In order to comfortably hold an electronic device (such as an iPad™) in front of, for example, one's stomach, or abdomen the neck strap 20 and the risers 18 are ergonomically designed to adapt to a variety of human torso shapes so that the neck strap 20 will preferably encircle or surround the neck, curve or extend down over the shoulder and then distribute the weight pressing on the user's torso while maintaining a substantially rigid lower portion of the risers. As seen in FIG. 1, in dashed lines, an alternate riser shape 18' is illustrated. This shape may be preferred by women, if the riser shape 18' could be artistically designed to be visually and/or ergonomically appealing on its own merits. A small brace 24 is shown holding the overall shape of the riser. Another stylized shape such as an "X" shape can be used.

A non-slip pad 30 is located near lower end 19 of each riser 18. There is preferably at least one on each riser 18. A resilient material can be used for the pad 30, such as a foamed polymer sleeve, for example. At a minimum, a high friction material should be on the front side of each riser 18.

Figure 3:
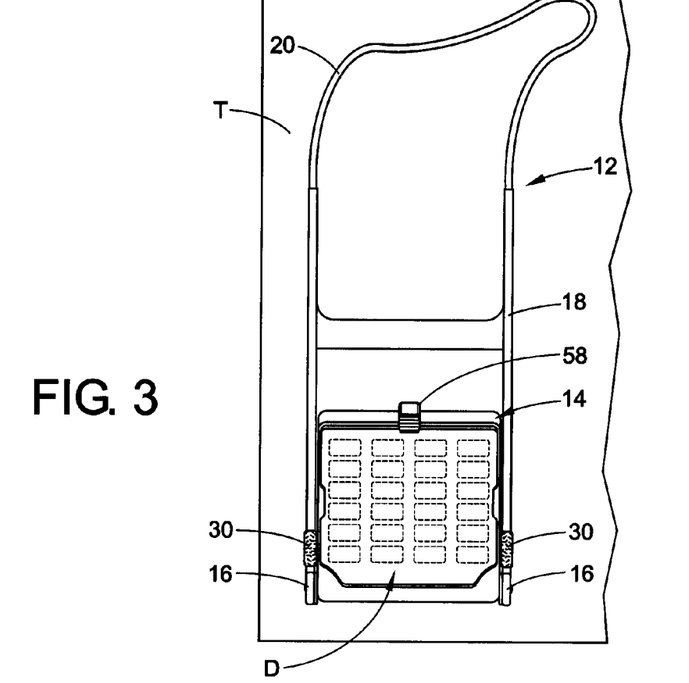
FIG. 3 is a rear elevational view of the electronic device holder of FIG. 2 taken long lines 3-3 of FIG. 2.

Referring now to FIG. 3, the holder frame 14 is a structure that removably holds an electronic device D while maximizing user access to the device's top surface, and, if present, any controls, ports, and the like that are accessed from a side edge or bottom surface of the device. Two alternate versions of the frame 14, 70 are shown in FIGS. 5-7B. The frame 14 is preferably a substantially rigid, single molded plastic piece that supports the bottom of the electronic device on a base flange 40, 80 which extends around a perimeter of the frame, preferably with a cross bar 42, 82 dividing two cut-outs on openings 41, 81. The frame 14 uses sidewalls 44, 72 to encircle or support the side edges of the device, combined with finger-like side tabs 50, 76 that overlap the top surface of the device sufficiently to removably hold the device within in the frame 14. That is, the frame holds the device in such a way that allows simple insertion and removal of the device from the frame (as shown in FIG. 6, for example).

Referring to FIGS. 5-7B, several preferred embodiments of members which removably hold the electronic device are illustrated. For example, side tabs 50, 76 extend over the side edges of the frame slightly, but are flexible enough to move or deflect laterally allowing insertion and removal of the device within the frame. Opposed corner tabs 54, 74 enclose a corner of the device including slight overlapping on the top surface of the device. The tabs removably hold the device as an edge of the device is inserted underneath the tabs as it is pivoted or rotated down into the body of the frame 14 (see FIG. 6). For example, one or more spring catches 58 can be used to provide an overlapping tab to allow inserting and removing of the device. The illustrated example of the spring catch 58 in FIG. 6 includes a fulcrum 60 molded into a portion of the sidewall 44, and a suitably shaped lever arm 62 (such as an L-shaped arm) that pivots on the fulcrum 60 (e.g., with a pair of raised protrusions rotating in mating sockets—not shown), and a spring 64 that biases the lever arm toward a locking position of overlapping a top of the device (such as shown in FIG. 6).

Figure 7A:
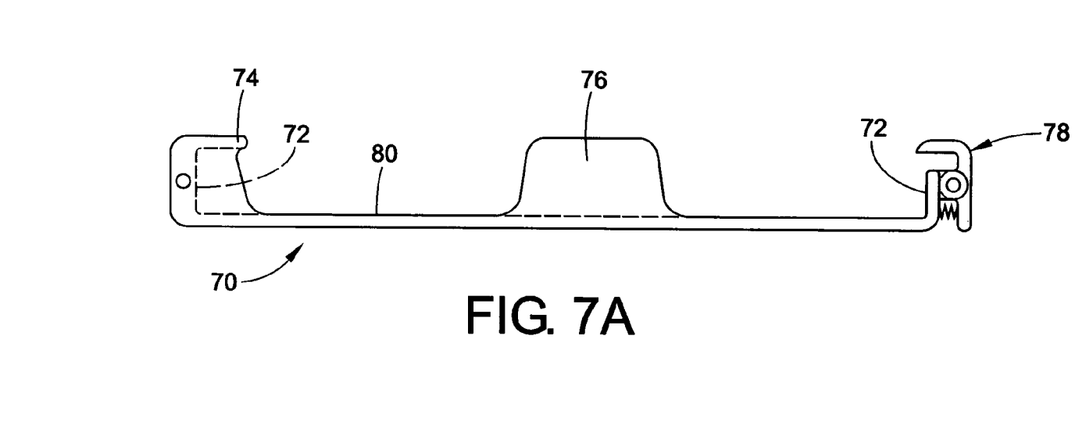
FIG. 7A is a side elevational view of an alternate frame for the holder.
Figure 7B:
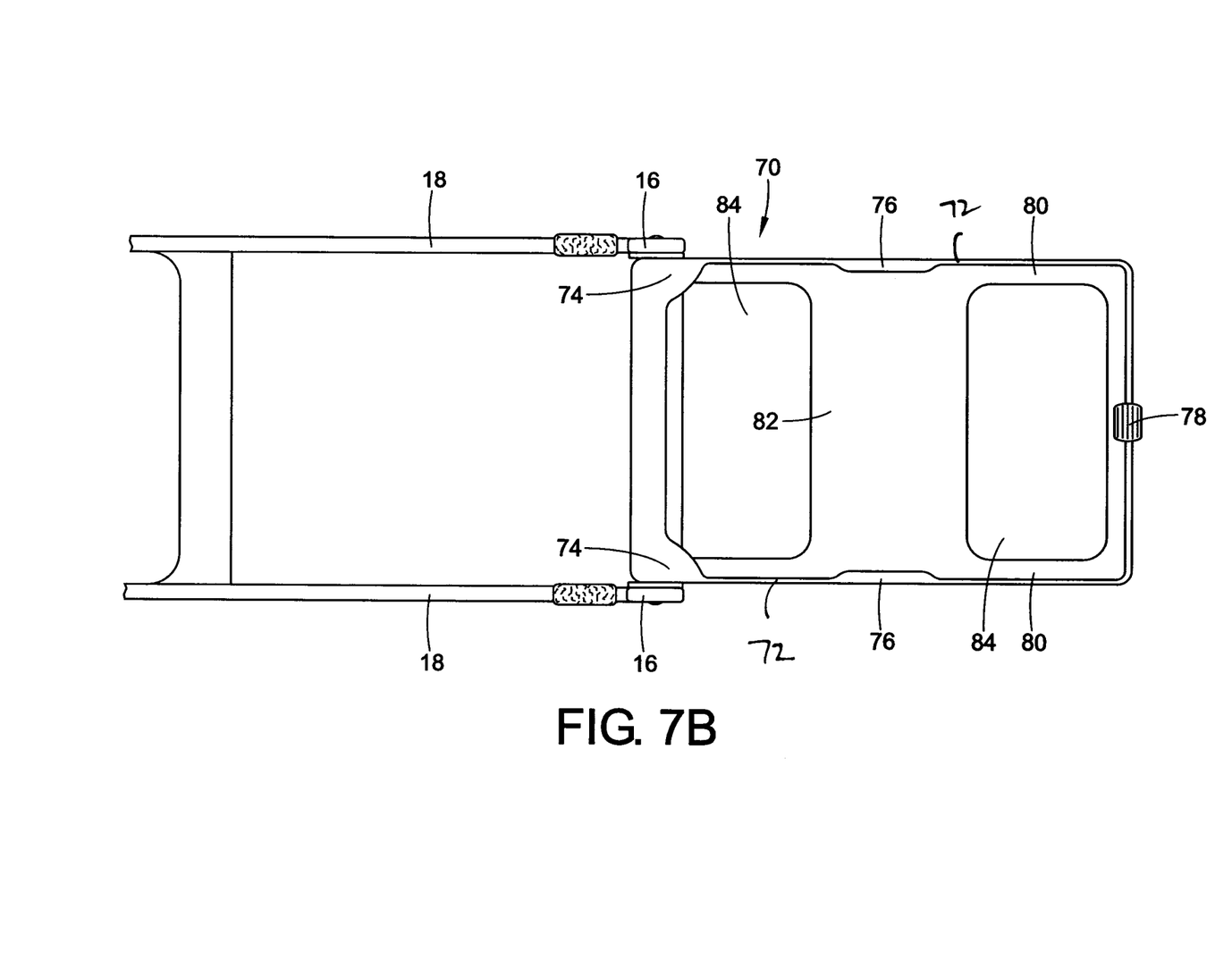
FIG. 7B is a top plan view of the frame of FIG. 7A.

FIGS. 7A and 7B show two views of an alternative frame embodiment 70 wherein a sidewall 72 has thin walls extending around the frame except for where the sidewall is needed to support, or be part of, a removably holding tab (e.g., corner tabs 74, side tabs 76, or spring tab 78). The base of the frame 70 still includes a base flange 80 and optionally a crossbar 82, which form openings 84 but they may have different shapes, so as to minimize frame weight and/or to allow access to device controls, ports, etc. that may be located on a side or bottom of the device. The frame can be made of a variety of materials, such as metal or rubberized plastic which acts as a shock absorbing material.

Referring now to FIGS. 2-5, a pivot 16 is shown pivotingly connecting a riser 18 to the frame 14. The pivot 16 is constructed such that it permits adjusting a pivot angle A between the riser and the frame, and further such that it will accommodate any selected pivot angle A (e.g., angles A1 to A5 as shown in dashed lines) until it is intentionally manually adjusted to another pivot angle A as selected by the user. That is, the harness and risers are rotated clockwise through angle A with respect to the frame. This adjustable hold feature can be provided by a variety of well known pivot designs including, for example, a friction controlled (clutch plate) rotating connection, or a rotating detent-stop pivot—either one using a spring bias or a wing-nut clamp; a ratcheting pivot like on a lounge-style lawn chair; a push button with a series of detent holes, and so on.

Figure 5:
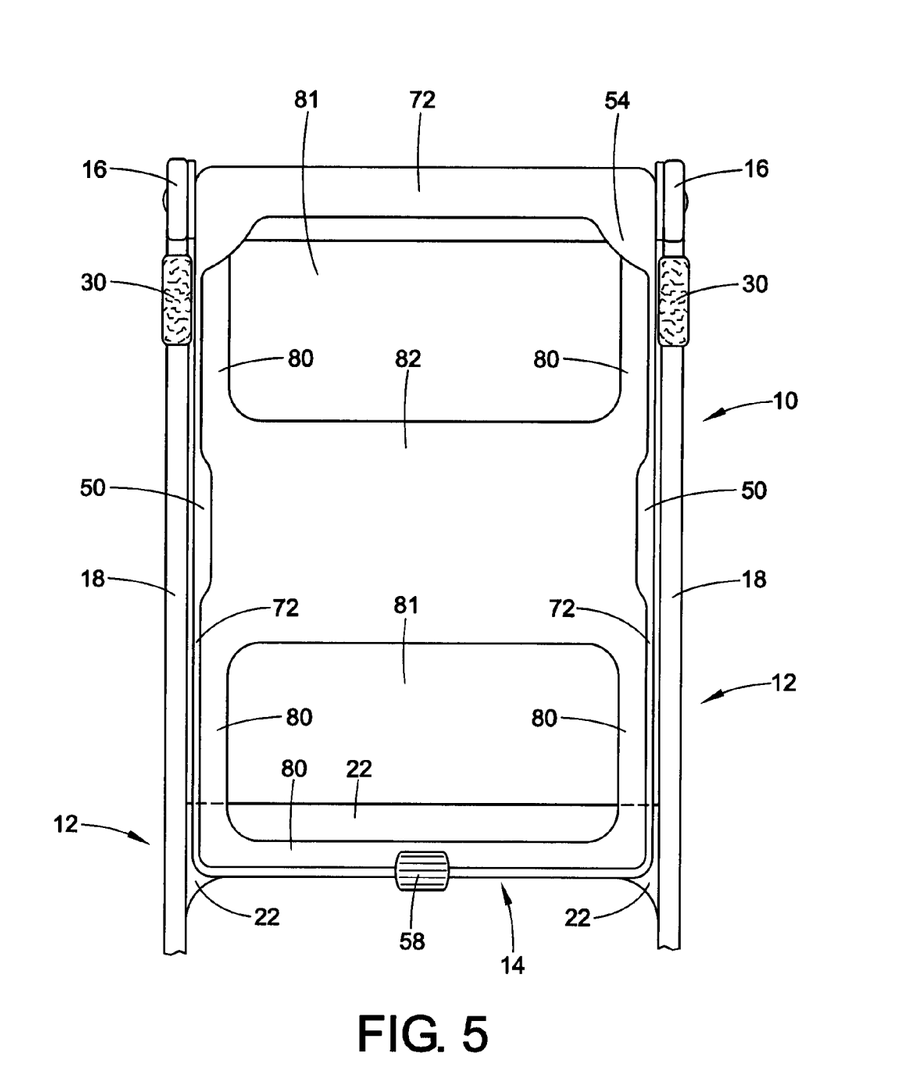
FIG. 5 is a top plan view of a electronic device holder in accordance with an alternate embodiment of the disclosure.
Figure 6:
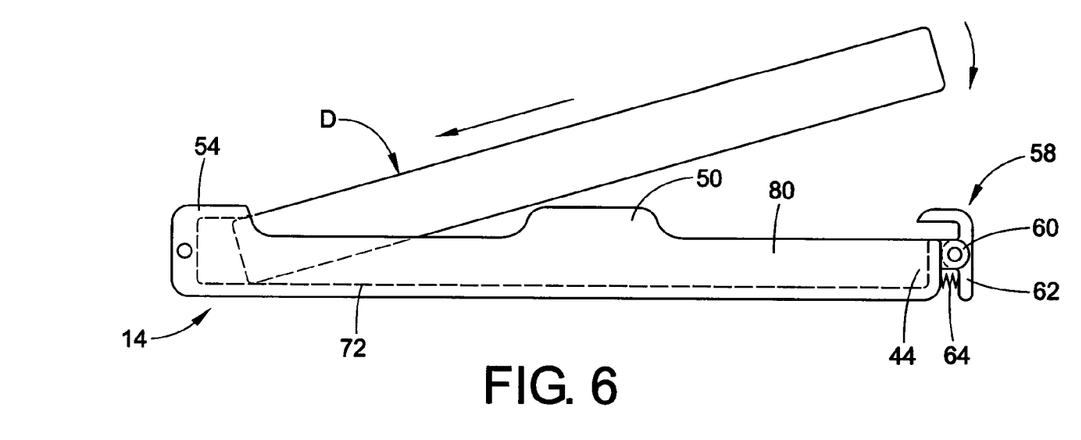
FIG. 6 is a side elevational view of the holder of FIG. 5.

In a preferred embodiment of the invention, the pivot 16 enables pivoting to a pivot angle A of zero degrees, as illustrated in FIG. 5. This pivot angle of zero degrees provides a secure carrying or stowing position where the device in the frame 14 is securely nested between the risers 18 (in effect held "within" the framework of the parallel risers, the pivot connection on one end, and preferably the brace 24 at another point spaced apart from the pivot-supported frame end). The device holder hangs on a user's body, resulting in the frame 14 (and the hold device) in a stable and protected vertical position closest to the user's body, thereby substantially eliminating a cantilevered load that adds strain on the back and neck of the user.

Figure 2:
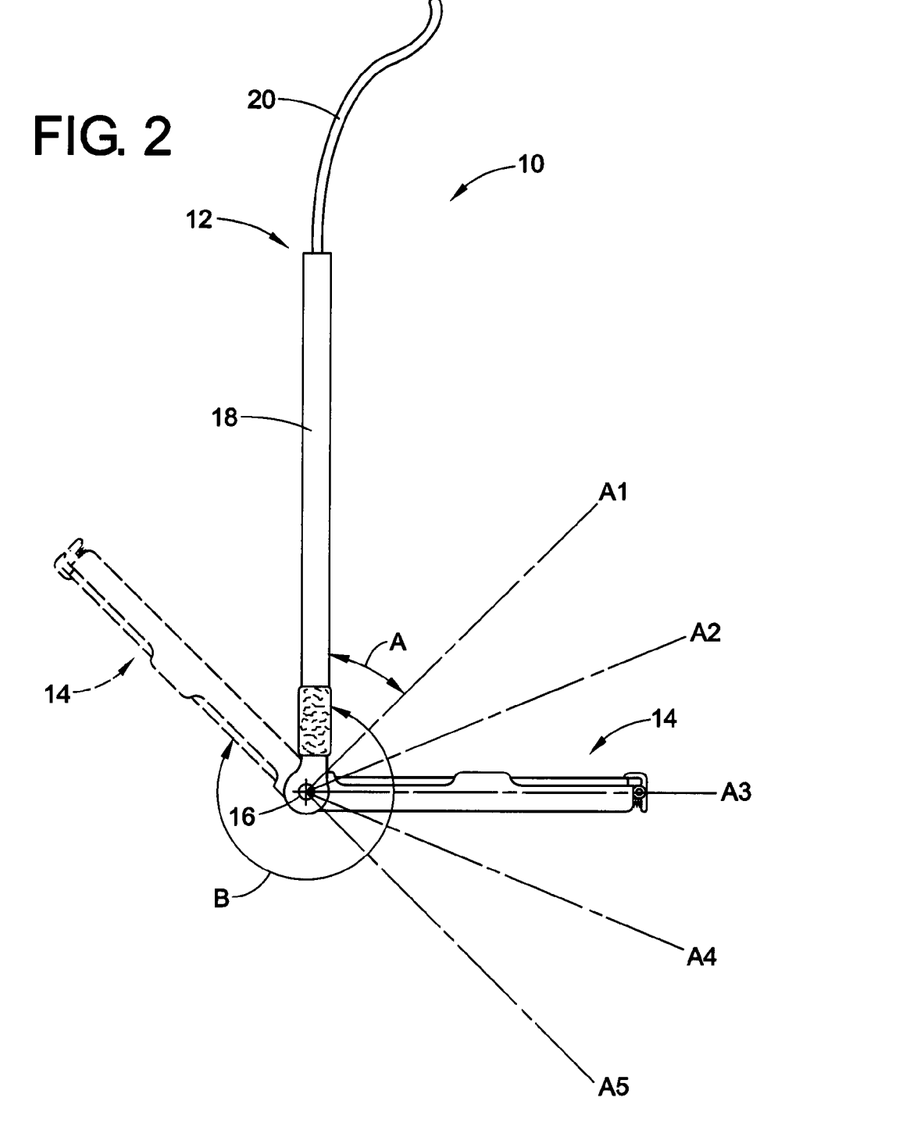
FIG. 2 is a side elevational view of the electronic device holder of FIG. 1.
Figure 4:
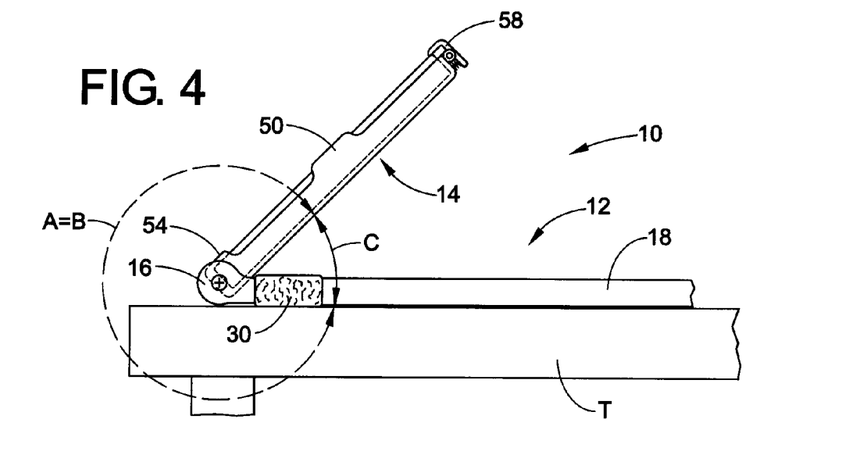
FIG. 4 is a side elevational view of the holder of FIG. 1 on a work surface.

Referring particularly to FIGS. 2-4, the pivot 16 can enable pivoting the frame 14 through a rotation of about 300 degrees in the opposite direction to a pivot angle A and is stopped at a maximum angle value of B (around 300 degrees). As shown in the top view of FIG. 3 and side view of FIG. 4, when the pivot angle A is adjusted to a maximum value of B, the device holder can be laid down on a convenient surface (e.g., table or desk top T (FIG. 4)) such that the device top surface is tilted to an angle C that is suitable for viewing the device screen as a stationary display (e.g., showing slides or a video at a sales booth), and is suitable for using the device as a desktop computer.

Preferably the maximum pivot angle B results in a tilt angle C that would be suitable for such uses (such as about 45 degrees). For example, the angle B may be 315 degrees (resulting in a tilt angle C equal to 45 degrees). Or perhaps it will be determined (e.g., by a survey) that a suitable maximum value B is 330 degrees (resulting in a tilt angle C of 30 degrees). Preferably the adjustable holder enables manual adjustment to a variety of suitable holding positions from a 90 degree tilt angle C up to the tilt angle C produced by the maximum pivot angle A=magnitude B.

As seen in FIGS. 2 and 3, the neck strap 20 has enough flexibility to bend at least forward enough to lie on the supporting surface (e.g., table top) without preventing the risers from lying substantially flat on the surface as shown in FIG. 4. The non-slip pads 30 are slightly raised above the front surface of the risers 18 so that they become the two "feet" or supports that the device frame stands on. The downward force of the device weight produces friction suitable for resisting horizontal movement of the device holder when the device is used by pressing on its top surface. The non-slip pads 30 are designed according to conventional methods to have a suitable coefficient of friction by selecting the pad material, the contact area of each pad, and if needed, by adding other non-slip pads (e.g., under the frame end, or elsewhere along the risers 18).

Finally, as mentioned above, the risers 18 are relatively stiff or rigid, at least at the end connected to the frame 14. It should now be apparent that the degree of stiffness and the length of the stiffened portion of the risers 18 must be adequate to prevent bending of the risers under normal loading conditions when the device is in the holder and in use either while hanging on a user or while laying on a supporting surface.

Figure 8:
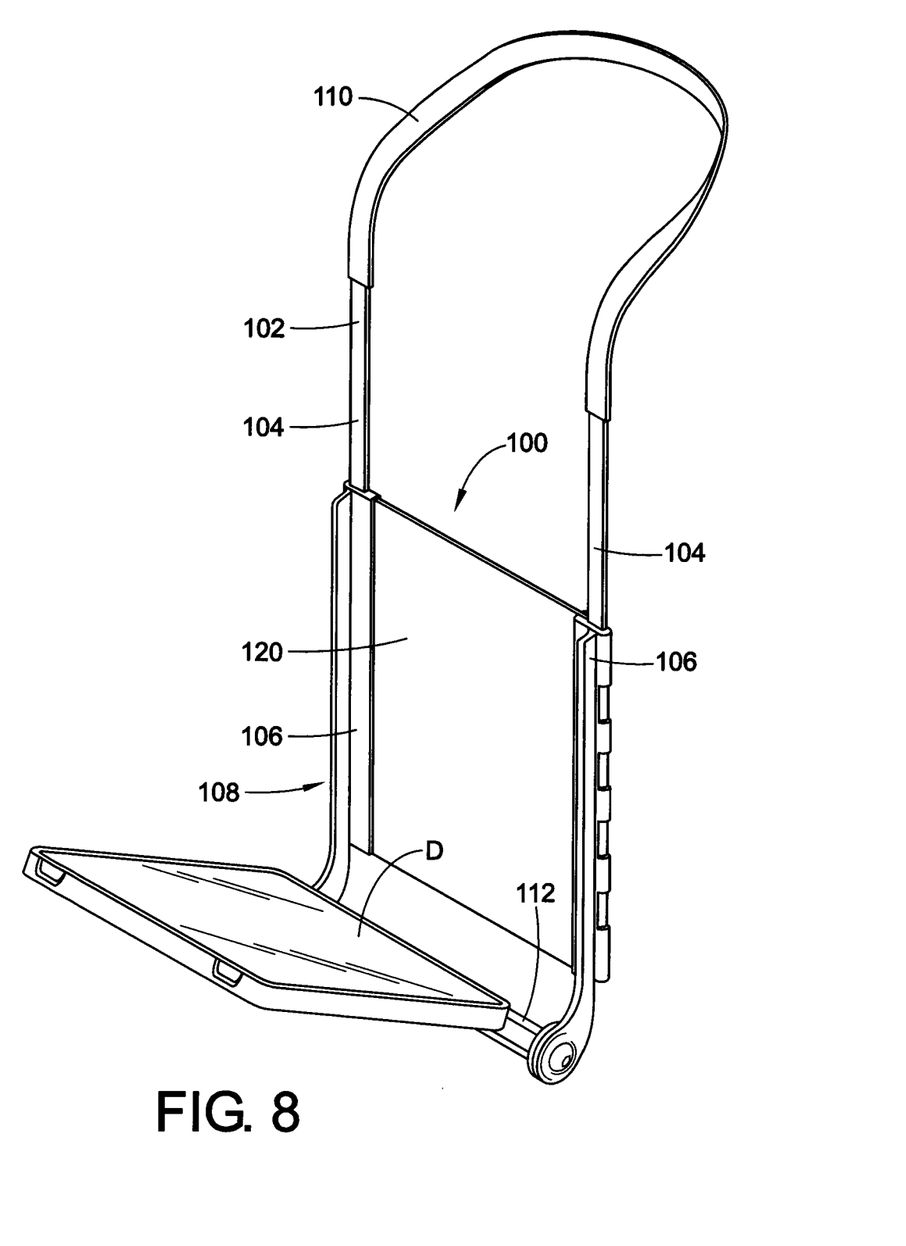
FIG. 8 is a perspective view of an electronic device holder with a shoulder harness in accordance with another aspect of the disclosure.

Referring now to FIG. 8, an alternate embodiment of the electronic device holder is shown. Holder 100 includes a harness 102 which has a pair of slidable arms or risers 104 which are slid within openings of slotted or parallel bars 106 which extend on opposite sides of frame assembly 108. The frame can be made of a variety of materials, such as metal or rubberized plastic which is semi-pliable and shock absorbing if the frame is dropped or bumped. The harness 102 can also serve as a handle.

The bars 104 which are preferably made of plastic can extend partially out of the slotted bars 106 or they can be completely removed. Bars 104 have a flexible strap 110 which extends between both bars and is connected to an outer end of each bar 104. The strap is made long enough to extend around a user's neck or around a car seat if necessary.

Attached to opposite ends of the slotted bars 106 is a substantially T-shaped member 112 which is pivotably or rotatably attached to bars 106 at pivot 115. A mounting bracket 114 (FIG. 9) extends from an end of the T-shaped member 112 and is secured to the member 112 by clip 116 to which an electronic device is secured by clips or other fastening members.

Figure 9:
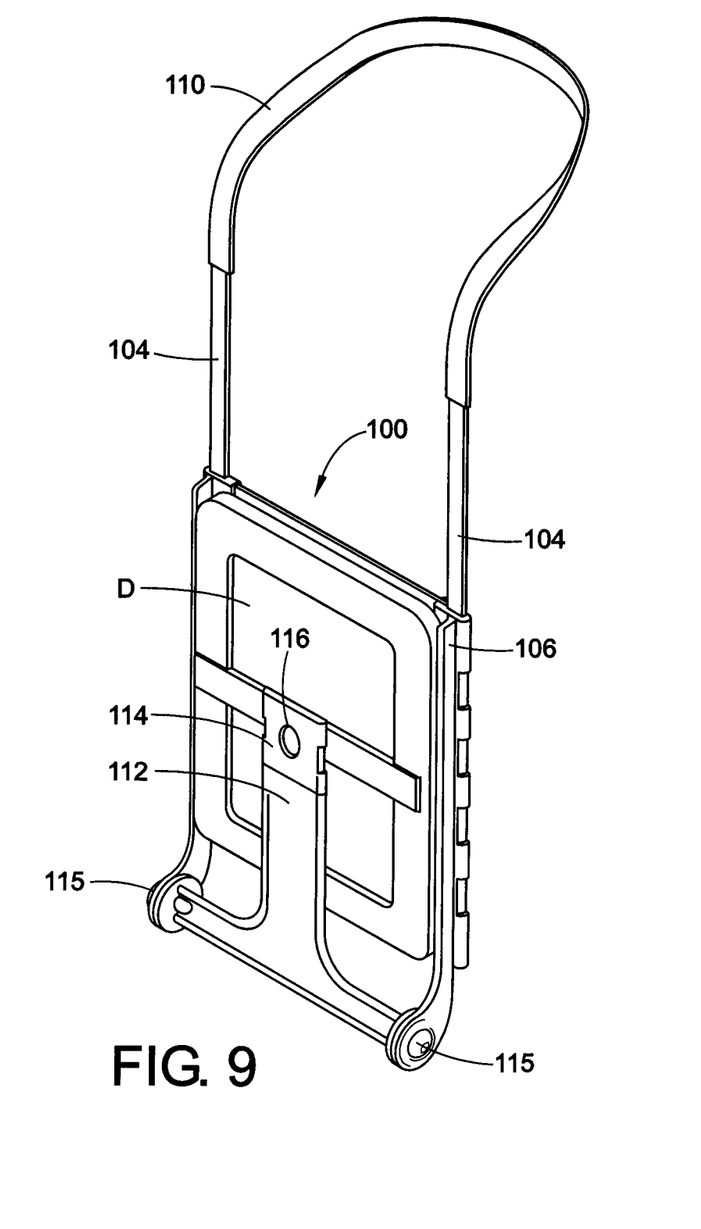
FIG. 9 is a perspective view of the holder of FIG. 10 in a stowed position.

T-shaped members can rotate with respect to the frame bars 106 in preferably 90 degree increments from 0 to 360 degrees. FIG. 9 shows the member 112 rotated to zero degrees or parallel with respect to frame bars 106.

A base member or wall 120 is formed between bars 106 for internal support and rigidity as well as covering the face of the electronic device D. The base wall 120 can be perforated or have openings thereon for dissipating heat from the device.

Figure 10:
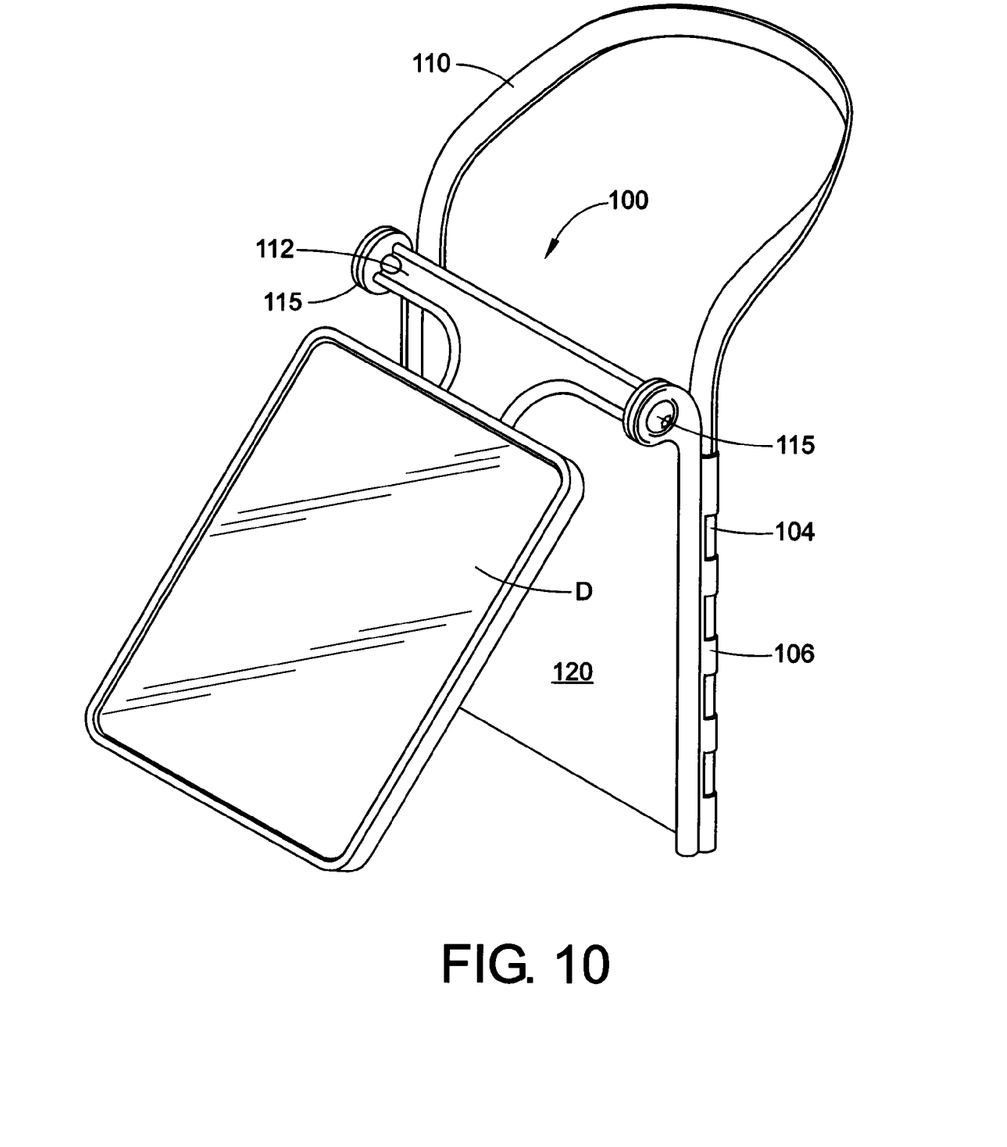
FIG. 10 is a perspective view of an electronic device holder for use with a car seat in accordance with another aspect of the disclosure.

Referring to FIG. 10, the bars 104 are fully inserted into openings of the slotted bars 106 on an opposite end to that shown in FIG. 8. That is, the T-shaped member 112 is positioned such that the pivots 115 are above the base wall 120. The device D is installed on an opposite side of member 112 such that a face 130 of the device faces outwardly with respect to the base 120. This configuration can be used with a car seat, for example. The strap 110 is inserted over a headrest of a car seat, and the device D is pivoted outwardly in an "in use" or "work" position, at pivot 115 such as at 45 degrees.

Figure 11:
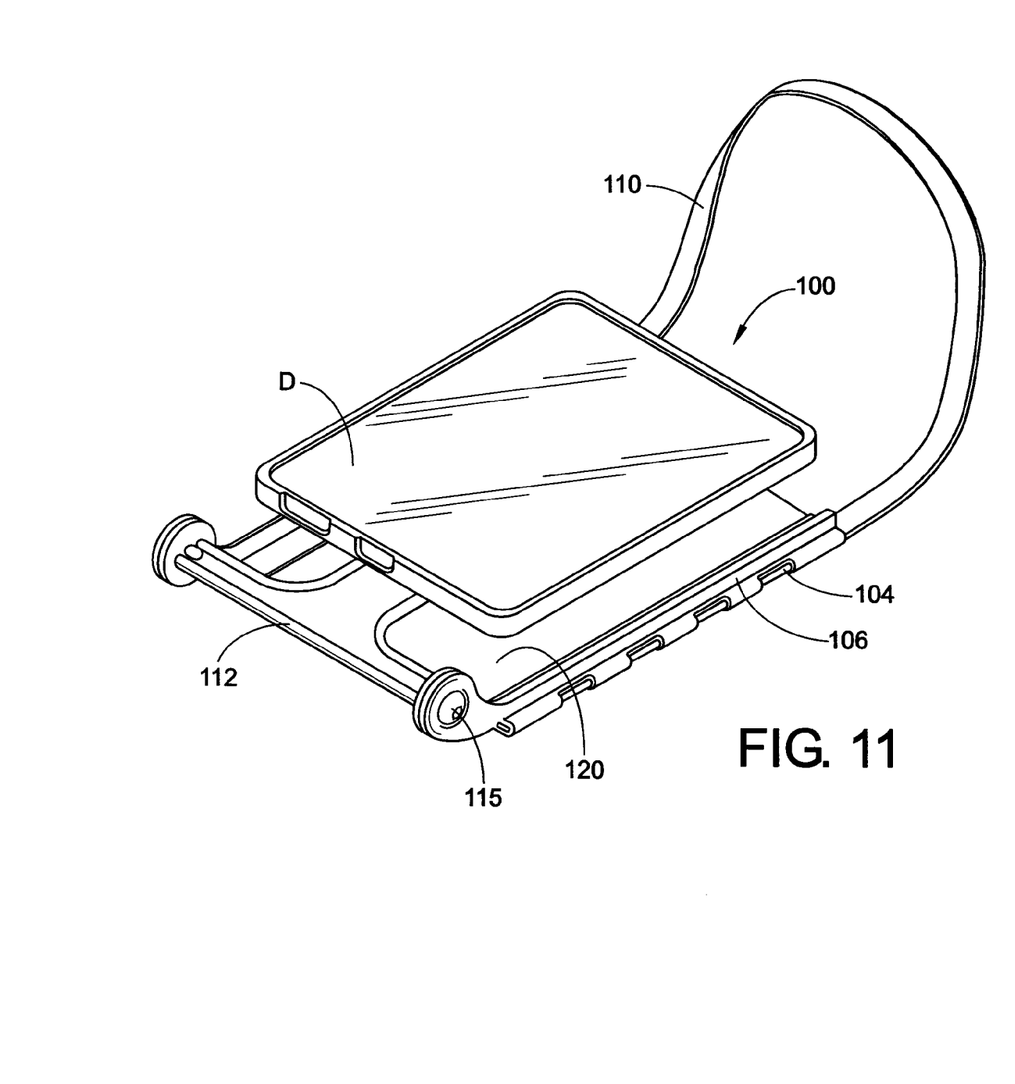
FIG. 11 is a perspective view of an electronic device holder in accordance with another aspect of the disclosure.

Referring to FIG. 11, the device D can be mounted on the same holder configuration shown in FIG. 8 but on an opposite side of the T-shaped member 112. The device face 130 is in an upward horizontal position (i.e. parallel to bars 106) as seen in FIG. 11 to be used as a clipboard, for example.

Figure 12:
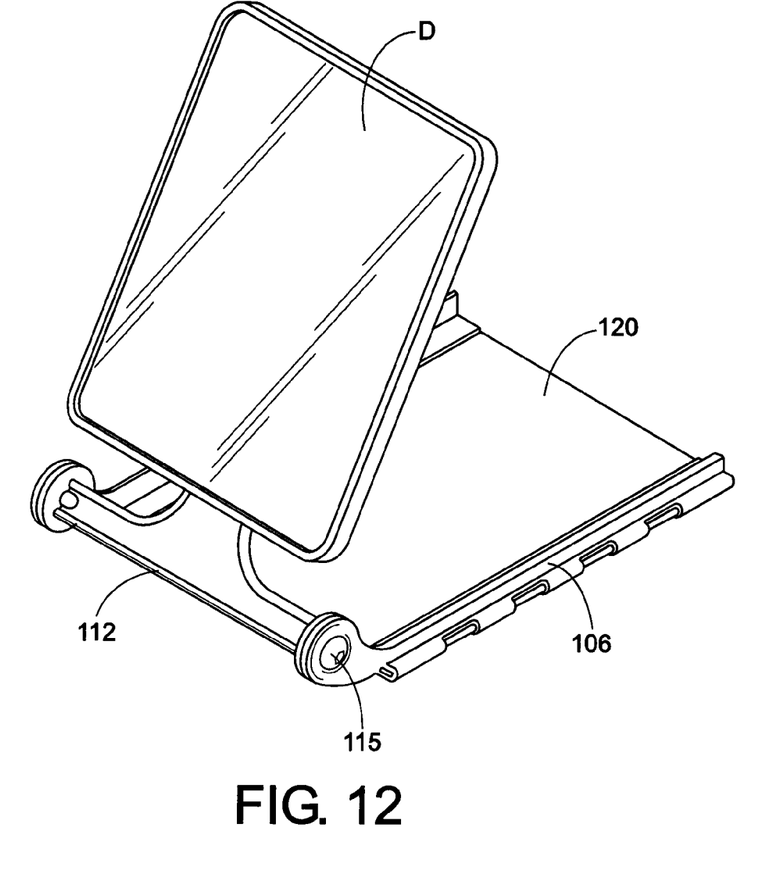
FIG. 12 is a perspective view of the holder of FIG. 11 in an inclined position.

Referring to FIG. 12, the device is positioned on the T-shaped member 112 in the same manner as shown in FIG. 10. The bars 106 and base plate 120 are positioned horizontally on a table top with the strap 120 and the bars 104 removed. The device D and the T-shaped member 112 are rotated on an angle such as about 45 degrees with respect to bars 106 in an "in use" or "work" position.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A holder for holding an associated electronic device, comprising: a frame having a flange having a cross bar extending across said flange, said flange further comprises a spring biased tab for facilitating insertion and removal of said associated electronic device; wherein said spring biased tab comprises a fulcrum and a lever arm pivotally mounted to said fulcrum wherein said lever arm comprises a biasing member for biasing said lever arm in a locking position, a harness comprising a flexible strap pivotably connected to said frame; wherein said harness comprises a pair of parallel elongated bars each having a pad thereon; wherein said elongated bars each comprise a pivot member pivotably connecting said frame to said harness; wherein said frame is rotated between first and second viewing positions about 300 degrees apart; wherein in said second viewing position said elongated bars are positioned on a work surface and said frame is positioned at an angle to said work surface; and
    at least one bracing member extending between said elongated bars; and wherein said frame comprises opposed sidewalls having one or more side tabs extending therefrom for retaining an associated electronic device within said frame.

2. The holder of claim 1, wherein each of pads comprise resilient material.

3. The holder of claim 1, wherein said frame comprises a substantially rigid single molded piece.

4. The holder of claim 1, wherein said frame further comprises one or more corner tabs formed on opposed corners of said frame.

5. The holder of claim 1, wherein said frame rotates clockwise with respect to said harness via said pivot member.

6. The holder of claim 5, wherein said harness and said frame are in relative alignment in a stowed position.

7. The holder of claim 6, wherein said frame is rotated at an angle with respect to said harness such that said frame is in a tilted viewing position.

8. The holder of claim 7, wherein said angle is about 45 degrees from horizontal.

\* \* \* \* \*